United States Patent

Bradburn

Patent Number: 5,995,247
Date of Patent: Nov. 30, 1999

[54] INPUT SCANNING AN IMAGE

[75] Inventor: Grahame Bradburn, Herts., United Kingdom

[73] Assignee: Fujifilm Electronic Imaging Ltd., London, United Kingdom

[21] Appl. No.: 08/904,271

[22] Filed: Jul. 31, 1997

[30] Foreign Application Priority Data

Aug. 12, 1996 [GB] United Kingdom .................. 9616859

[51] Int. Cl.⁶ .................................................. H04N 1/04
[52] U.S. Cl. .......................... 358/483; 348/316; 348/241
[58] Field of Search .................................... 348/312, 316, 348/323, 324, 241, 295, 297; 358/482, 483; 250/252.14

[56] References Cited

U.S. PATENT DOCUMENTS

| | | | |
|---|---|---|---|
| 4,698,515 | 10/1987 | Sepai | 348/324 |
| 4,754,153 | 6/1988 | Hicks | 348/323 |
| 4,974,810 | 12/1990 | Fiske | 250/216 |
| 5,223,841 | 6/1993 | Ricker | 342/174 |
| 5,280,354 | 1/1994 | Nakamura | 358/168 |
| 5,471,244 | 11/1995 | Wolfe | 348/257 |

OTHER PUBLICATIONS

Patent Abstracts of Japan, vol. 010, No. 158 (E–409), Jun. 6, 1986 (JP 61 013888 A).
Patent Abstracts of Japan, vol. 95, No. 8 (JP 07 225434 A).
European Search Report dated Mar. 18, 1997.

Primary Examiner—Amelia Au
Assistant Examiner—Jingge Wu
Attorney, Agent, or Firm—Sughrue, Mion, Zinn, Macpeak & Seas, PLLC

[57] ABSTRACT

A method of input scanning an image using a detector comprising an array of radiation sensors, the method comprising 1) exposing the radiation sensors to radiation from the image over a plurality of sampling periods, and for each respective sampling period:

2) obtaining a single data value from each radiation sensor;

3) summing the data values obtained during the sampling period;

4) determining a peripheral response value in accordance with the sum obtained in step 3), wherein the peripheral response value for each sampling period is determined independently of the peripheral response values for the other sampling periods; and 5) modifying the data values in accordance with the peripheral response value obtained in step 4).

13 Claims, 11 Drawing Sheets

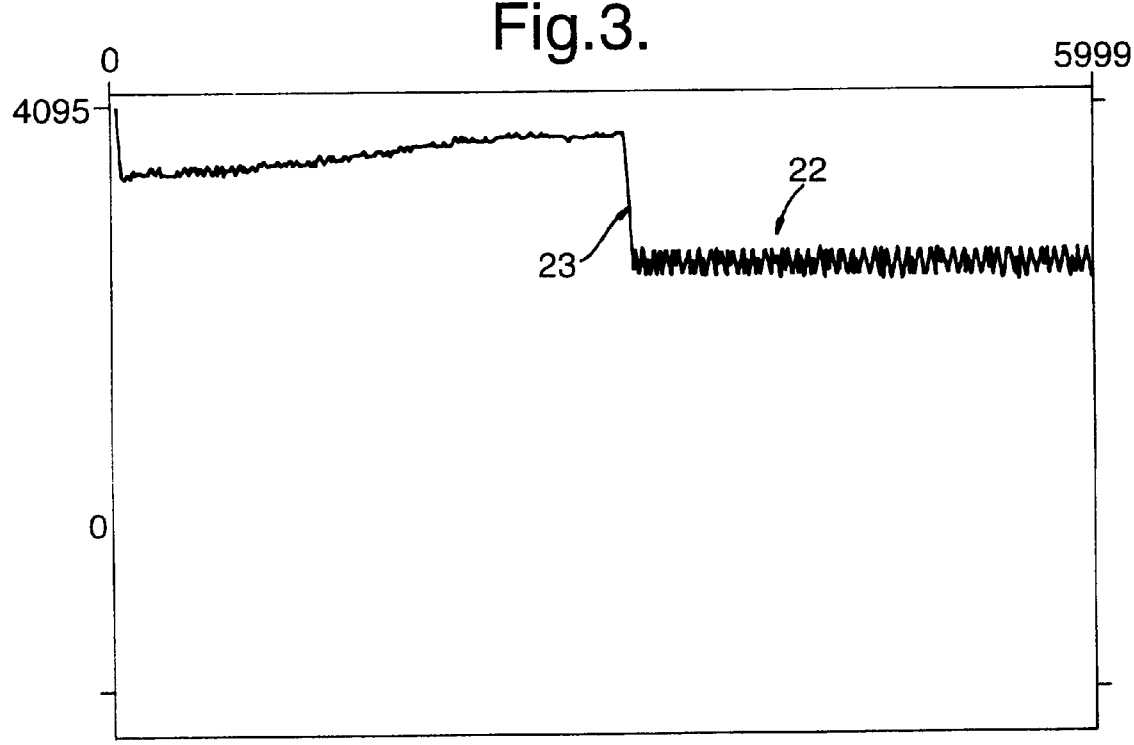
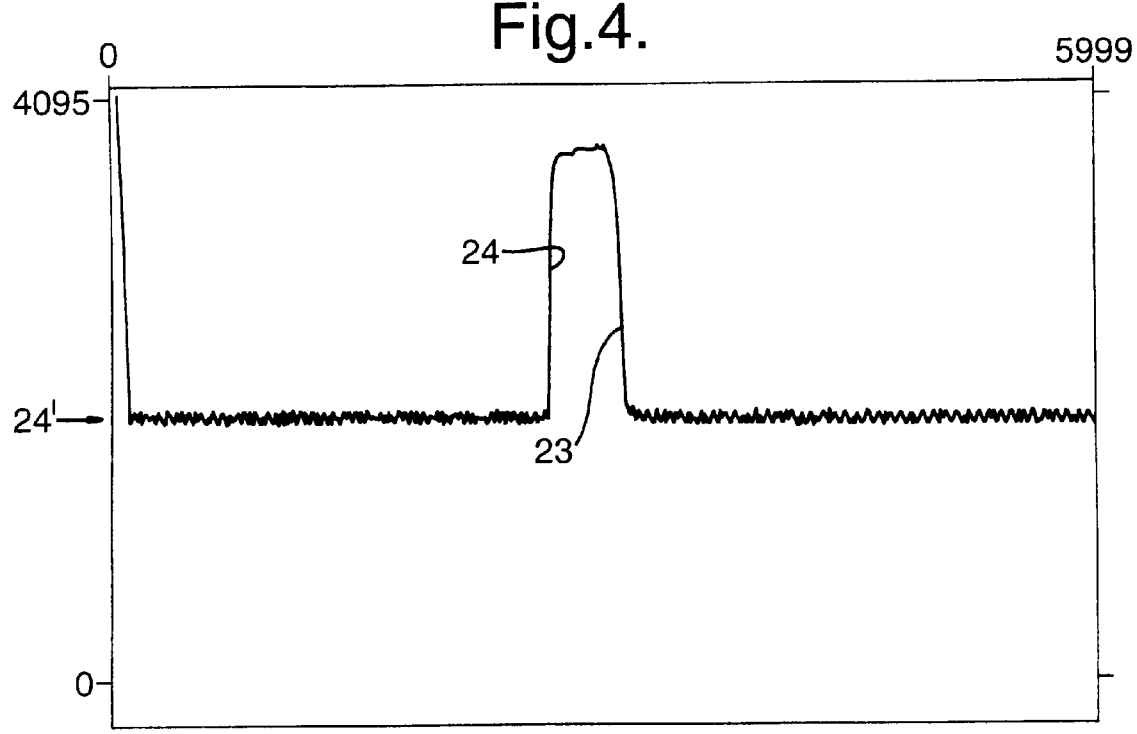

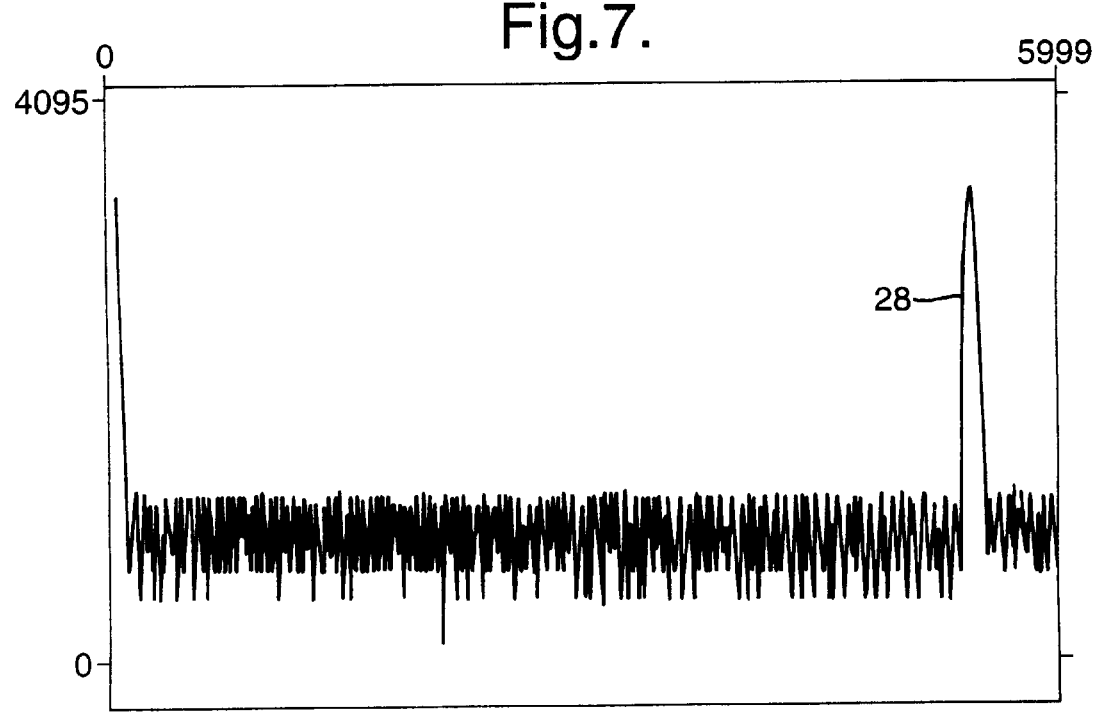
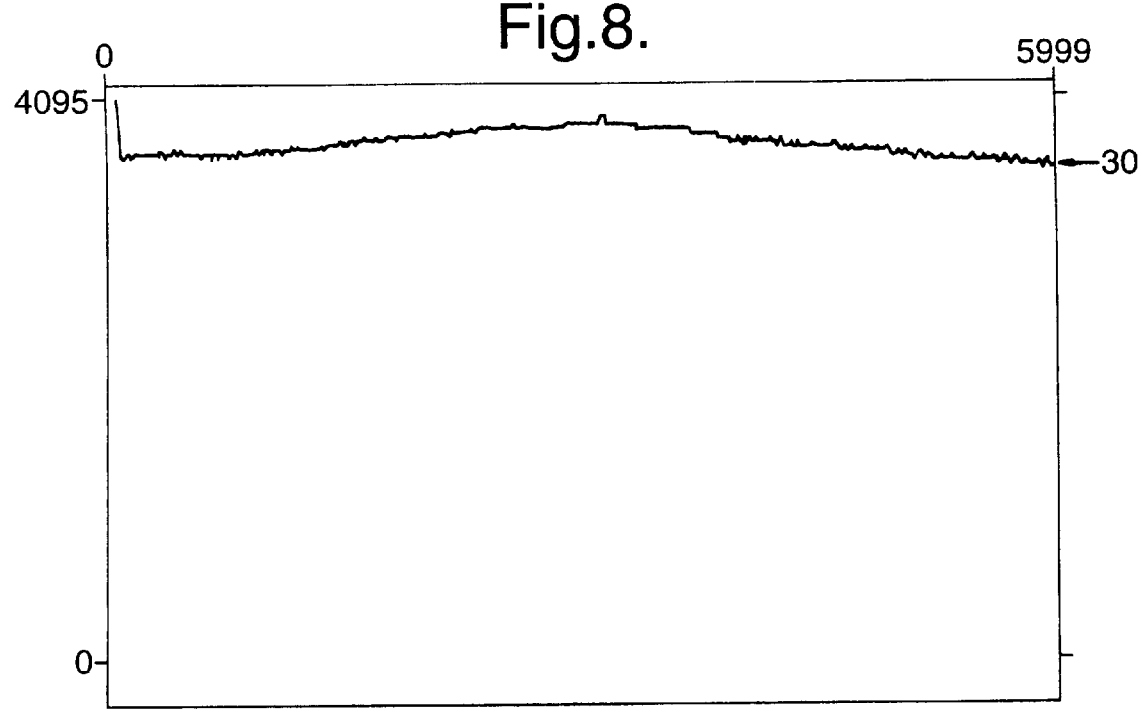

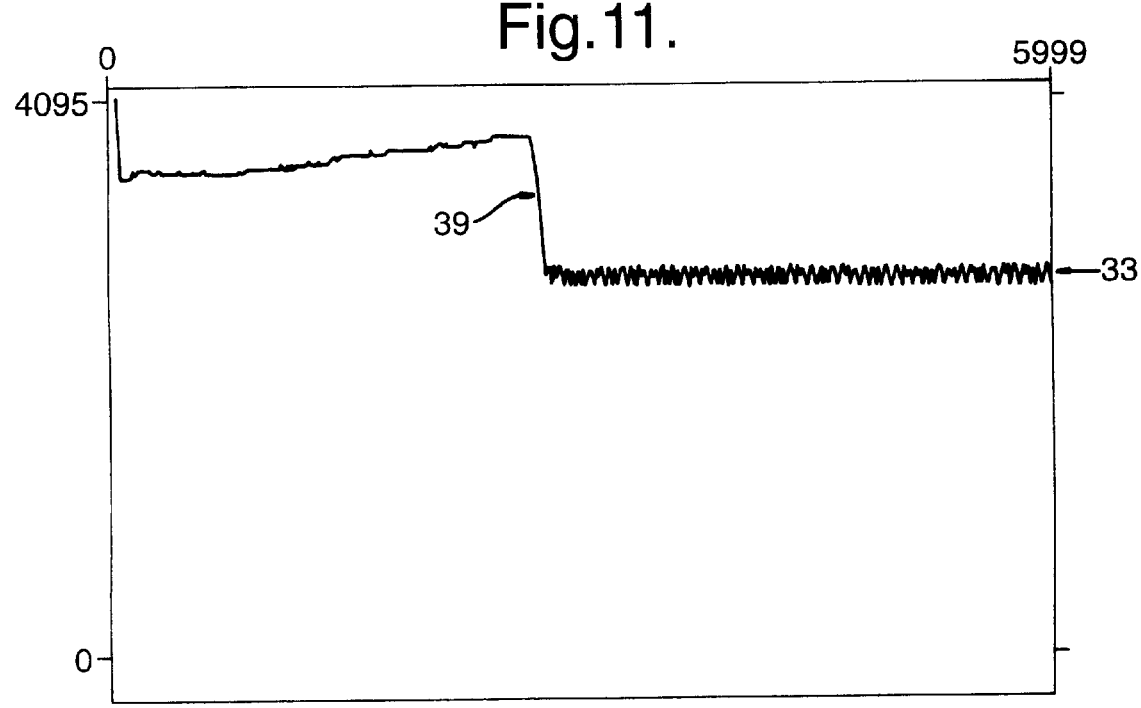
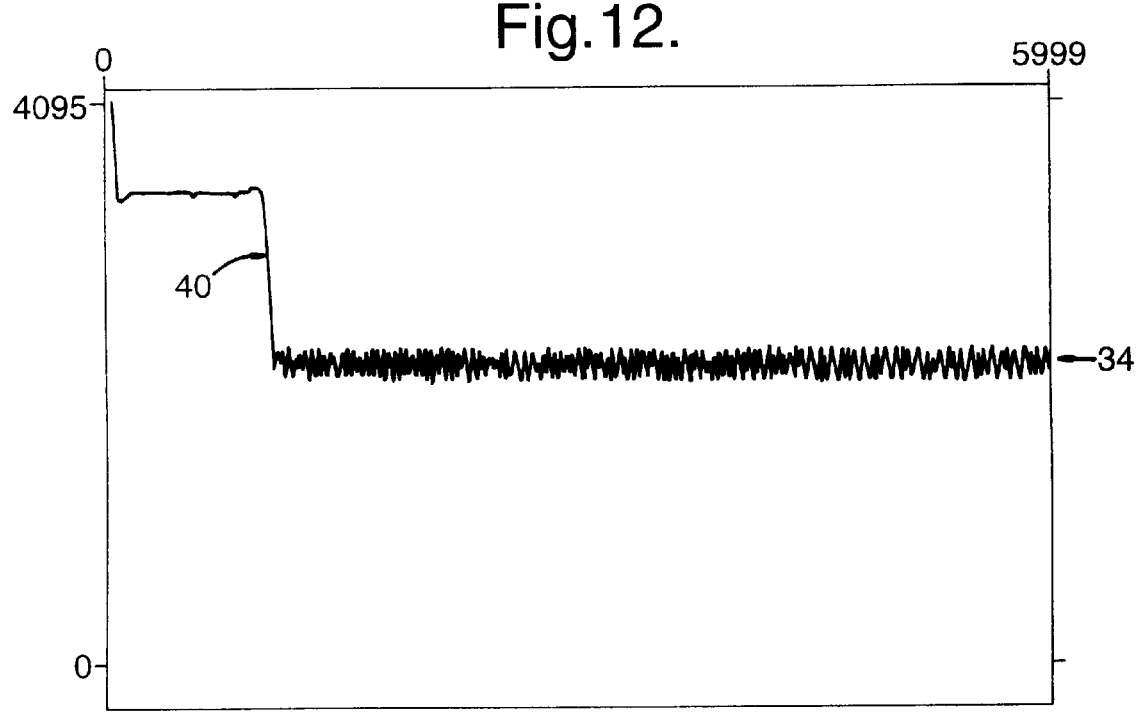

INPUT SCANNING AN IMAGE

FIELD OF THE INVENTION

The present invention relates to a method and apparatus for input scanning an image using a detector comprising an array of radiation sensors, such as a CCD array.

DESCRIPTION OF THE PRIOR ART

CCD arrays are used in a variety of fields to monitor incident radiation, particularly light. The radiation sensitive devices integrate the incident radiation to develop a charge relating to the total radiation incident on the device which, in a transfer step, is transferred into the associated transfer buffers. Typically, the transfer buffers are constituted by one or more shift registers. The contents of the shift register or shift registers are then shifted out to obtain information relating to the incident radiation. For optimum speed, while the array is being exposed, the contents of the shift register or registers from the preceding transfer are simultaneously shifted out.

CCD arrays have a particular application in the field of image scanning such as flat bed scanning. In this application, a transparency is positioned between a source of illumination and a linear CCD array, relative movement being caused between the array and the transparency so that the transparency containing the image is scanned. It is becoming increasingly important to determine very accurately the intensity of light incident on the light sensitive devices from the transparency. We have found that with commercial CCD arrays aberrations are apparent particularly when scanning transparencies with high contrasts. This is manifested in a continuously variable level shift which appears to depend on the degree of illumination.

Possible reasons for these aberrations are optical flare or spurious CCD response (otherwise known as peripheral response).

One attempt at dealing with this problem is described in our earlier patent EP-B-0197634. The contents of the shift registers are read out twice at the same regular rate while transferring the accumulated charge stored in the radiation sensitive devices between the two read out steps.

A DC offset value is then obtained from an isolation buffer (which is a transfer buffer not associated with a corresponding radiation sensitive device).

This method has proved successful but slows down the imaging operation since a double readout time is required.

A further known method of reducing peripheral response is to mount and accurately align a slit close to the pixel array to shield peripheral areas of the CCD array (in particular the transfer buffers) from the incident illumination.

U.S. Pat. No. 4,974,810 describes a method of compensating for flare light in an optical imaging system in which a flare light detector views flare light and produces a signal related to the amount of light viewed. A compensator reduces the signal from the image detector in response to the signal from the flare light detector. This system cannot compensate accurately for peripheral response.

U.S. Pat. No. 5,280,354 describes a video camera with a flare correcting circuit. The flare correcting circuit detects the average luminance level during a time period of eight fields of the digital video signal. This system cannot accurately correct for peripheral response in an image signal which may change significantly between consecutive image fields.

SUMMARY OF THE INVENTION

In accordance with a first aspect of the present invention there is provided a method of input scanning an image using a detector comprising an array of radiation sensors, the method comprising 1) exposing the radiation sensors to radiation from the image over a plurality of sampling periods, and for each respective sampling period:

2) obtaining a single data value from each radiation sensor;

3) summing the data values obtained during the sampling period;

4) determining a peripheral response value in accordance with the sum obtained in step 3), wherein the peripheral response value for each sampling period is determined independently of the peripheral response values for the other sampling periods; and 5) modifying the data values in accordance with the peripheral response value obtained in step 4).

The first aspect of the present invention provides a method of correcting for peripheral response with improved accuracy. A unique peripheral response value is calculated independently for each sampling period; ie. the sum is generally unrelated to the radiation incident on the detector outside the sampling period.

In accordance with a second aspect of the present invention there is provided a method of input scanning an image using a detector comprising an array of radiation sensors, the method comprising 1) exposing the radiation sensors to radiation from the image;

2) causing relative movement between the detector and the image whereby the detector receives radiation from successive portions of the image over a plurality of sampling periods, and for each respective sampling period:

3) obtaining a data value from each radiation sensor;

4) summing the data values obtained during the sampling period;

5) determining a peripheral response value in accordance with the sum obtained in step 4); and 6) modifying the data values in accordance with the peripheral response value obtained in step 5.

The second aspect of the present invention provides an improved method of correcting for peripheral response in an input scanning system in which a detector and an image are moved relative to each other in a scanning operation.

The sum may comprise a rolling average of the data values obtained over a plurality of sampling periods. However preferably a single data value is obtained from each radiation sensor during each sampling period, and the peripheral response value for each sampling period is determined independently of the peripheral response values for the other sampling periods.

The first and second aspects of the present invention provide particularly useful methods of compensation of the spurious detector response known generally as peripheral response. Peripheral response results in an error in each pixel value. It has been found that the amount of peripheral response is proportional to the total radiation incident on the detector over a given sampling period.

The detector may comprise any detector which experiences problems of spurious response, but typically the detector comprises a CCD array. It has been postulated that peripheral response in a CCD is a charge which builds up in transfer buffers associated with the radiation sensors in response to incident radiation. It has been found that this "peripheral response" is proportional to the total illumination on the CCD array for any given scan line. The fact that the unwanted peripheral response is directly proportional to the amount of light incident on the CCD array indicates that this may also be a capacitive effect between two parts of the CCD. For a given capacitance, the resulting voltage will be directly proportional to the collected charge which is proportional to the total incident light.

The peripheral response value may be obtained using hardware or software. For example the peripheral response value may be obtained by inputting the sum of the data values into a suitably programmed look-up table. Alternatively the peripheral response value may be obtained in software by performing a predetermined algorithm on the sum of the data values.

The predetermined algorithm or the programming of the look-up table may be determined by developing a suitable mathematical model of the peripheral response. Preferably however they are determined in a previous calibration procedure which characterises the peripheral response of the detector to varying amounts of incident light. In one example, the calibration procedure comprises the following steps:

a) illuminating the detector to give a substantially uniform response across the array of sensors;

b) masking a portion of the array of sensors so that a number of the sensors are blacked out;

c) obtaining a dark signal from the blacked out sensors;

d) masking a different number of sensors and repeating step c); and e) defining the variation of the dark signal with the number of blacked out sensors.

The "defining" step e) may comprise fitting a curve to a number of data points obtained in a number of repeats of step c). Alternatively the "defining" step e) may simply comprise storing the values obtained in step c) and loading the values (or related values) into a look-up table.

An example of an algorithm obtained according to this process is as follows:

$$S = (a(x+c)) - S_b$$

where S is the peripheral response value, $S_b$ is a black level signal representative of the pixel data values when no light is incident on the detector, a and c are constants for a given length of sampling period, and x is proportional to the number of sensors not masked in the respective step b) or d) of the calibration procedure.

The algorithm may vary (either in terms of the form of the equation or the values of the constants) depending on the particular detector being used.

The value x is proportional to the total radiation incident on the exposed part of the array (since the illumination is uniform across the array). Therefore a suitably normalised version of the total radiation value can be input as the value x in the above algorithm.

The summed value (suitably normalised) is inserted as the value x in the above equation, and the constants $S_b$, a and c are determined in the previous calibration procedure.

The offset value S can then be obtained by the following equation:

$$S = \left( a \left( \sum_i S_i + c \right) \right) - S_b$$

Where $\sum_i S_i$ is the sum of all signals $S_i$ on pixel i, summed over all CCD pixels.

The value of the constants a and c will depend on the particular CCD array used, the sampling period and the colour of the incident radiation.

According to a third aspect of the present invention there is provided apparatus for input scanning an image, the apparatus comprising 1) a detector comprising an array of radiation sensors;

2) an imager for exposing the radiation sensors to radiation from the image over a plurality of sampling periods;

3) means for obtaining a data value from each radiation sensor for each sampling period;

4) means for summing the data values obtained for each sampling period;

5) means for determining a peripheral response value in accordance with the sum, wherein the peripheral response value for each sampling period is determined independently of the peripheral response values for the other sampling periods; and 6) means for modifying the data values in accordance with the peripheral response value.

In accordance with a fourth aspect of the present invention there is provided apparatus for input scanning an image, the apparatus comprising 1) a detector comprising an array of radiation sensors;

2) an imager for exposing the radiation sensors to radiation from the image;

3) a drive for causing relative movement between the detector and the image whereby the detector receives radiation from successive portions of the image over a plurality of sampling periods;

4) means for obtaining a data value from each radiation sensor for each sampling period;

5) means for summing the data values obtained for each sampling period;

6) means for determining a peripheral response value in accordance with the sum; and 7) means for modifying the data values in accordance with the peripheral response value.

The apparatus may be implemented in hardware or software. The means for determining a peripheral response value may comprise a look-up table which provides the peripheral response value on input of the value obtained by the first means.

The radiation may comprise white light or coloured light (for instance alternating red, green and blue light).

BRIEF DESCRIPTION OF THE DRAWINGS

An embodiment of the present invention will now be described with reference to the accompanying figures, in which:

FIGS. 1 to 16 are graphs of the logarithm of the CCD response along the length of a CCD array as measured in the calibration procedure;

EMBODIMENT

Two sources of image degradation are peripheral CCD response, and optical flare. The following description of an embodiment of the invention first presents results which characterise and separate the peripheral response and optical flare responses of the Fairchild 191 CCD array. It is first shown that there is a DC offset in the observed signal from the CCD and that this is due to a peripheral CCD response and not optical flare. This response is characterised and plotted as a function of the illuminated area of the CCD array. A method of correcting this offset according to the present invention is then presented.

Initially an experiment is conducted to prove that a substantial component of the flare is due to CCD peripheral response and not to optical flare. The method is described below with reference to graphical results. All figures are relative and absolute signal values have not been calculated.

Figure 17:
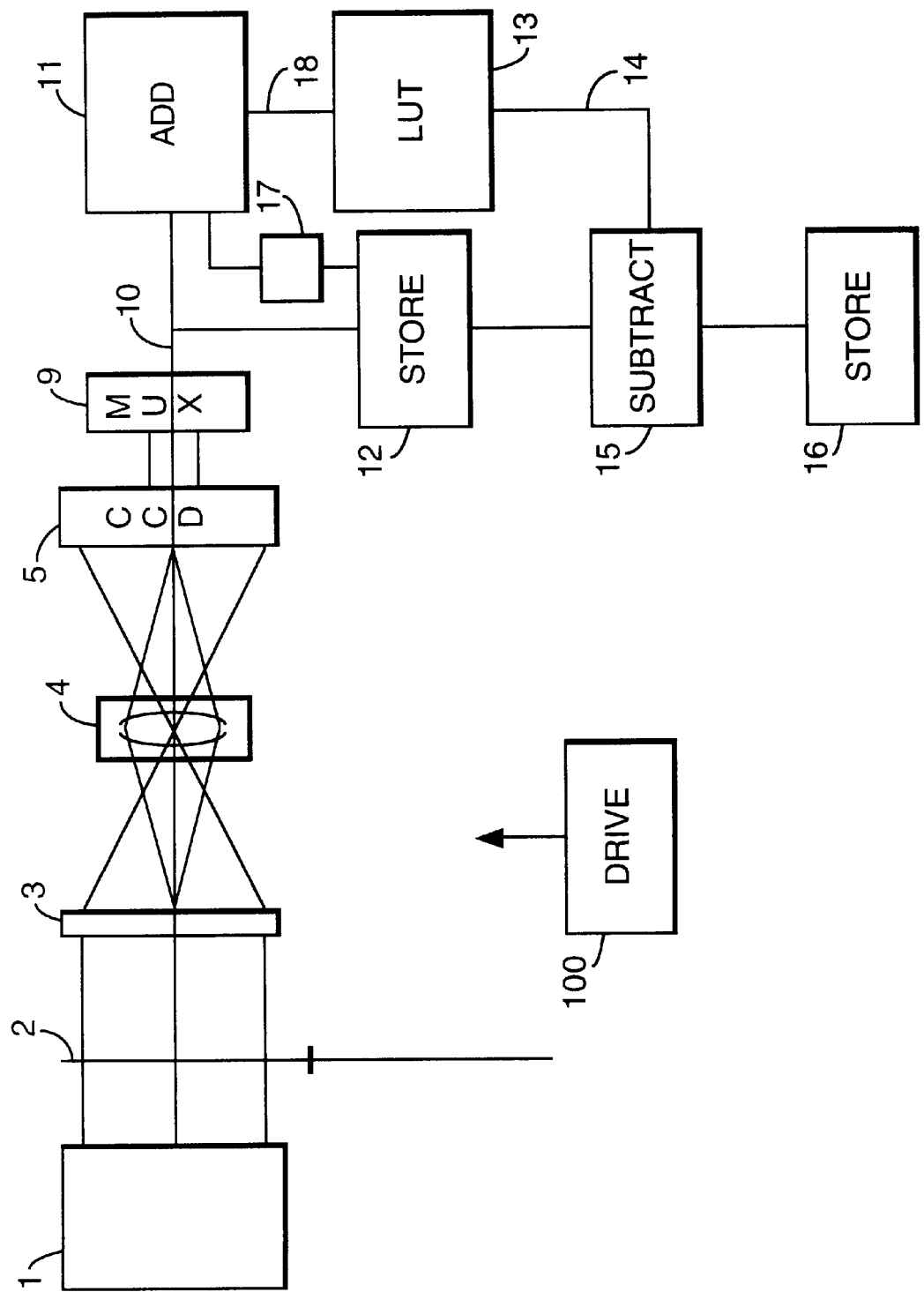
FIG. 17 is a schematic block diagram of apparatus according to the second aspect of the present invention.

FIG. 17 illustrates an example of input scanning apparatus according to the second aspect of the present invention. The apparatus can be used in input scanning, and also in the following experimental and calibration procedures.

The image scanning apparatus comprises a source of white light 1, and a rotating filter disc 2. Light passes through the filter disc 2 and appropriately illuminates a transparency 3. The illuminated transparency 3 is imaged onto a linear CCD array 5 by an imaging lens 4. The filter disc 3 may comprise three sectors arranged to transmit red, blue and green light successively. The transparency 4 (containing the image) is mounted in a conventional holder (not shown) and moved by a drive 100. Light from the transparency 4 impinges on a linear CCD array 5.

The filter disc 3 may comprise three sectors arranged to transmit red, blue, and green light successively.

Figure 18:
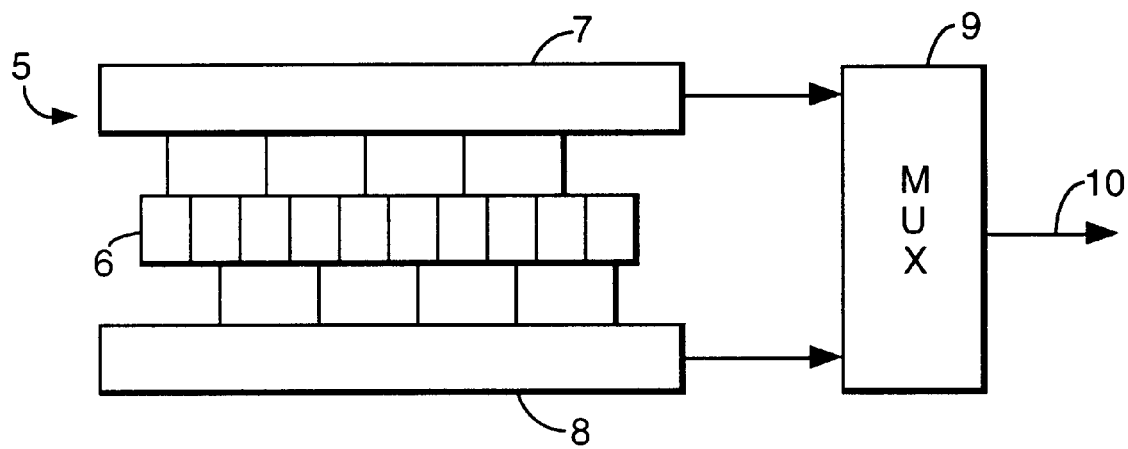
FIG. 18 is a schematic view of the CCD array shown in FIG. 17.

FIG. 18 is a schematic view of the CCD 5 shown in FIG. 17 arranged in a line. The CCD array 5 comprises a plurality of photodiodes 6. In practice, there may be at least 6000 photodiodes 6 but only ten are shown in FIG. 18. Two shift registers 7,8 are positioned on either side of the photodiodes 6 and alternate photodiodes are electrically connected to the shift registers 7,8 respectively. The serial outputs of the shift registers 7,8 are connected to a multiplexer 9 which provides a multiplexed output 10 corresponding to the previous contents of the photodiodes in sequence. An example of a suitable CCD array 5 is the Fairchild CCD 151 or CCD 191.

Figure 1:
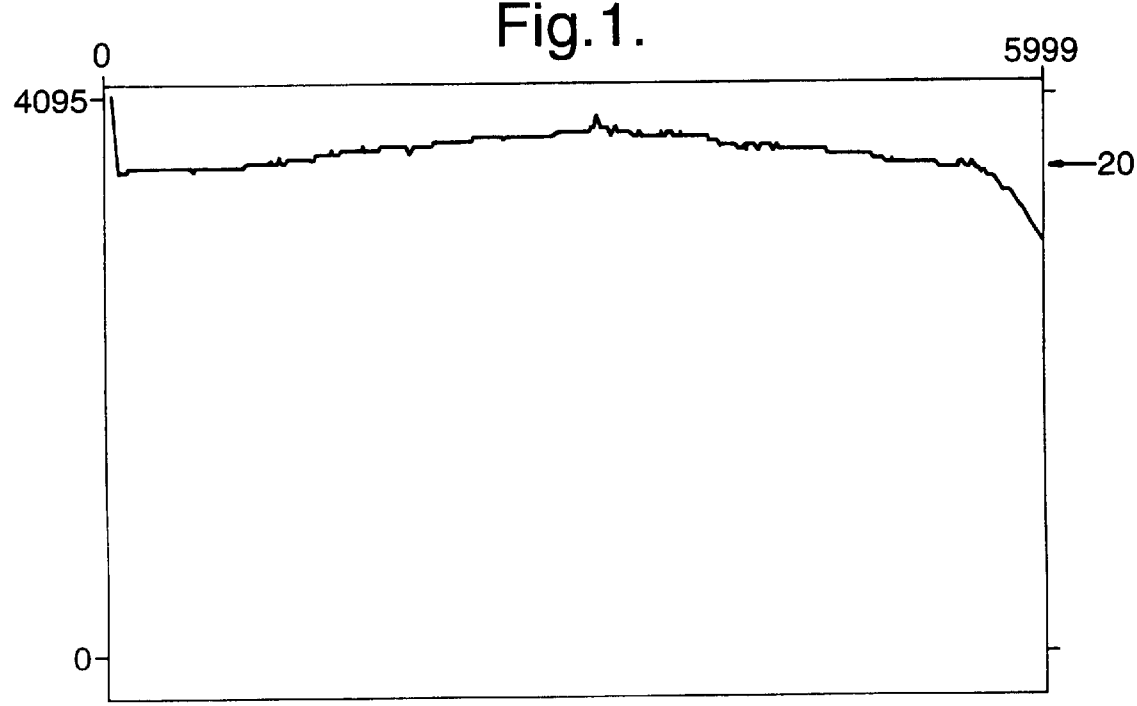
Figure 2:
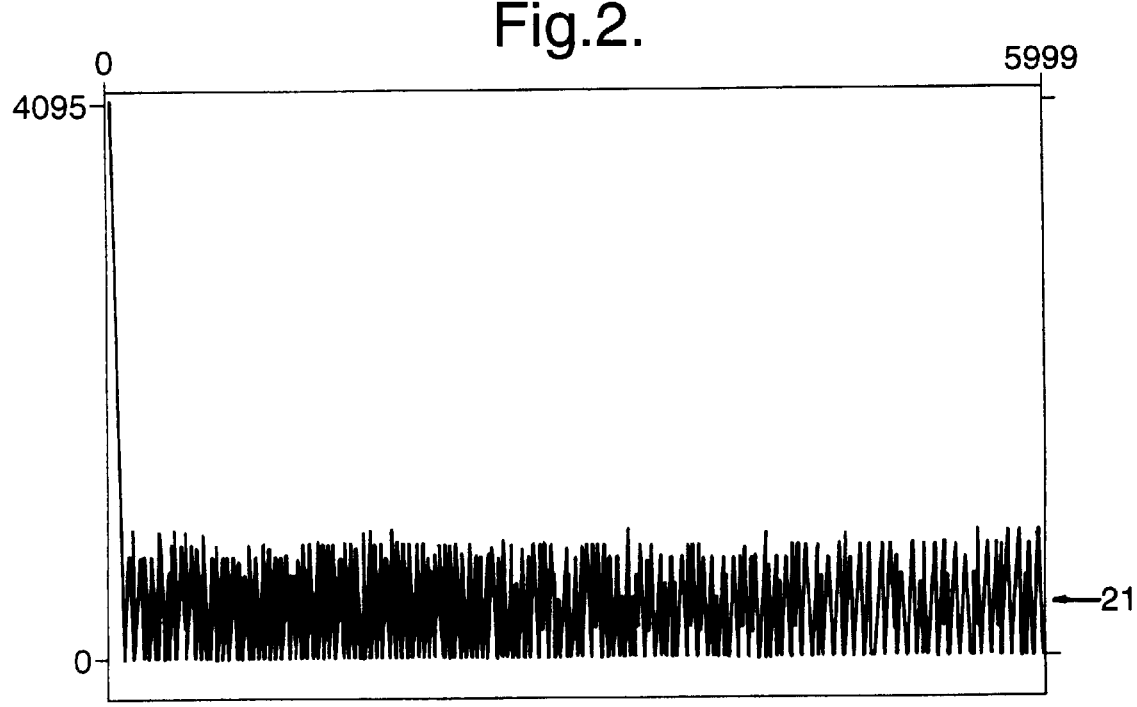

An experimental procedure for characterising the response of the CCD 5 will now be described with reference to the graphs of FIGS. 1 to 16. In FIGS. 1 to 16 the vertical (y) axis represents the base 10 logarithm of the CCD signal response from each pixel in the CCD array and the horizontal (x) axis represents distance along the CCD array. The light source 1 is set up to give a reasonably uniform response across the 6000 pixels of the CCD array 5 as shown in the graph of FIG. 1. This graph shows the level 20 of illumination with the lens aperture set at F/4 and the transparency 3 removed. For comparison, FIG. 2 shows the black level 21 obtained when the lens 4 is covered. A screen is then placed in the plane of the transparency 3 covering approximately half the illuminated area, see FIG. 3. Comparing FIG. 3 with FIGS. 1 and 2 we see that the black level adjacent to the edge 23 in FIG. 3 is higher than the black level 21 shown in FIG. 2. This difference immediately indicates that there is an unwanted response in the black region adjacent to the edge 23 since ideally the signal level in this area would be the same as the level 21 in FIG. 2. At this stage it is not possible to say definitely whether this is due to optical flare or a spurious (ie peripheral) CCD response although the fact that the black level response appears to be a CCD offset perhaps indicates that it is more likely to be a CCD characteristic than optical flare since one would expect optical flare to have a more structured distribution.

With the above screen fixed in position a second screen is moved across the uncovered part of the transparency plane so as to vary the illuminated area on the CCD. As the illuminated area varies so does the resulting black level. FIG. 4 shows the edge 23 of the first screen, and the edge 24 of the second screen. The black level 24' in this Figure can be compared with that of FIGS. 2 and 3. This shows how the unwanted response is dependent upon the amount of light incident on the CCD array and a similar method is used later to characterise the effect. It is still not possible to establish from these results the cause of the unwanted response since both optical flare and spurious CCD response are likely to be dependant on the size of illuminated area.

Figure 5:
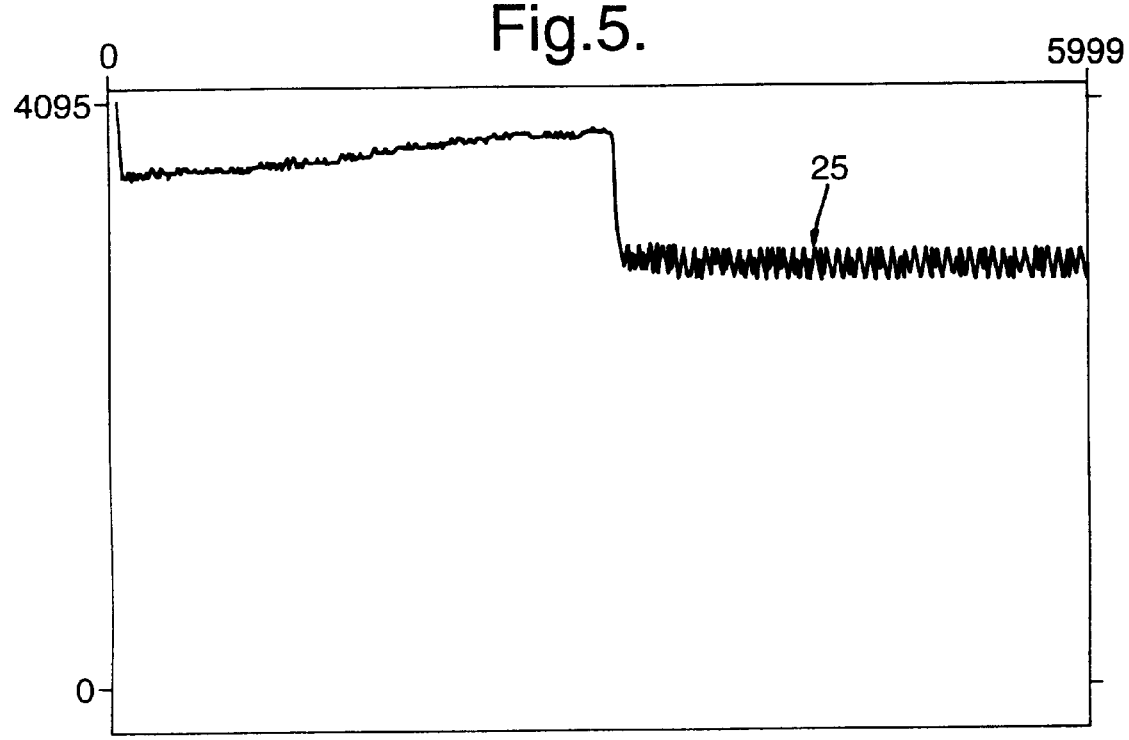

If the fixed screen is then removed from the plane of the transparency 3 and placed in a position directly in front of the CCD 5 corresponding to its original image position then the response obtained, FIG. 5, is identical to that shown in FIG. 3. This must indicate that the change in black level is due to a spurious CCD response since the black region 25 in this case is shielded from any optical flare by the screen.

Figure 6:
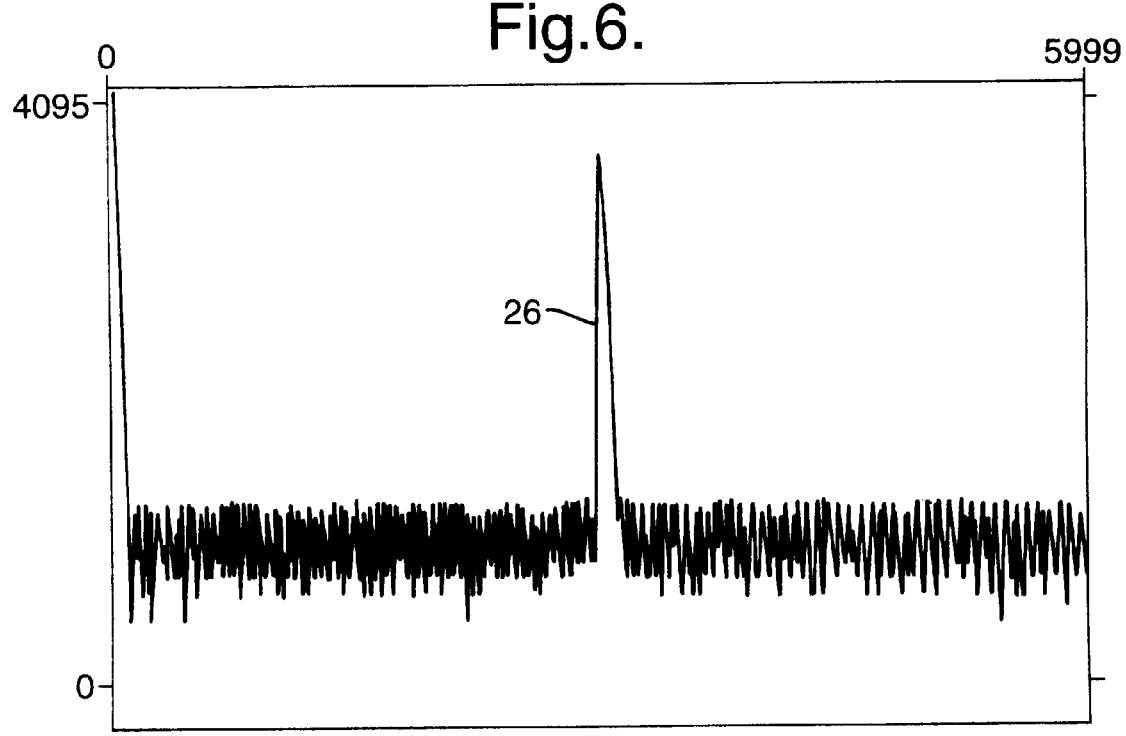
Figure 9:
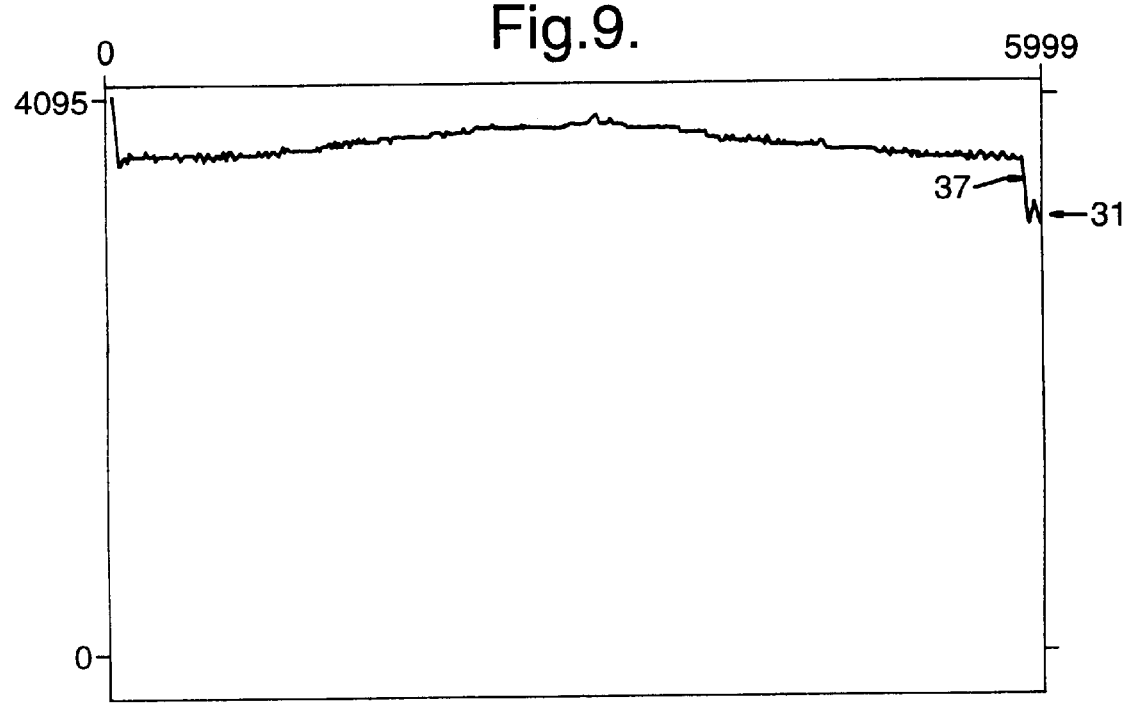
Figure 10:
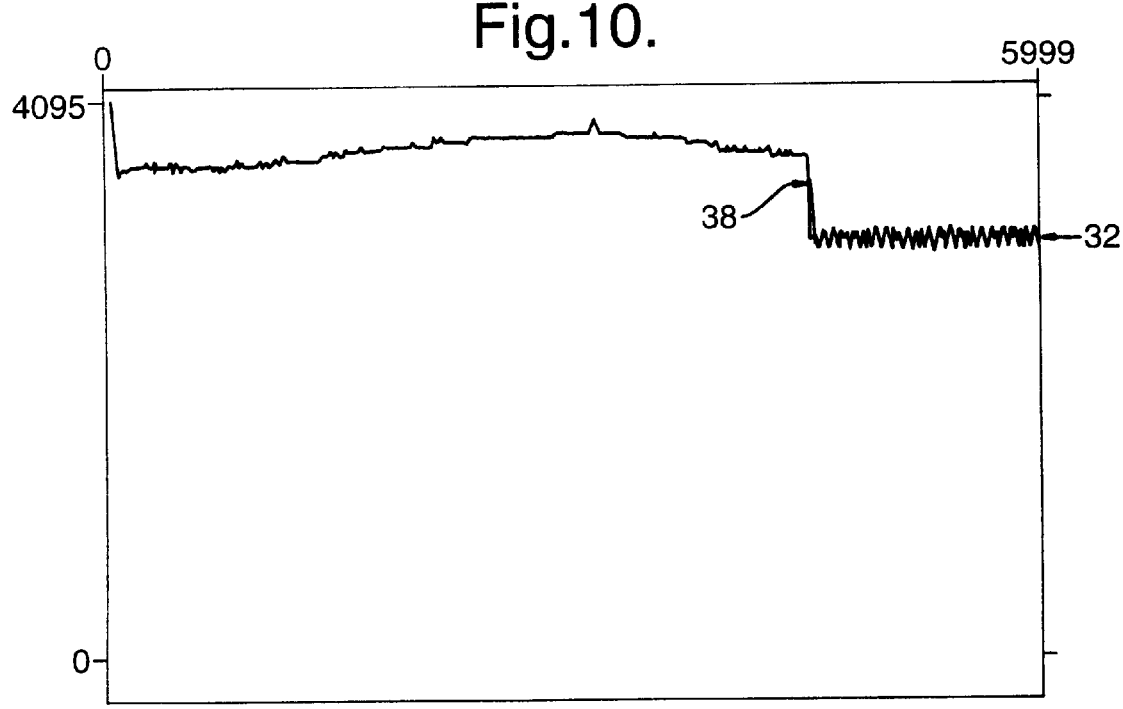
Figure 13:
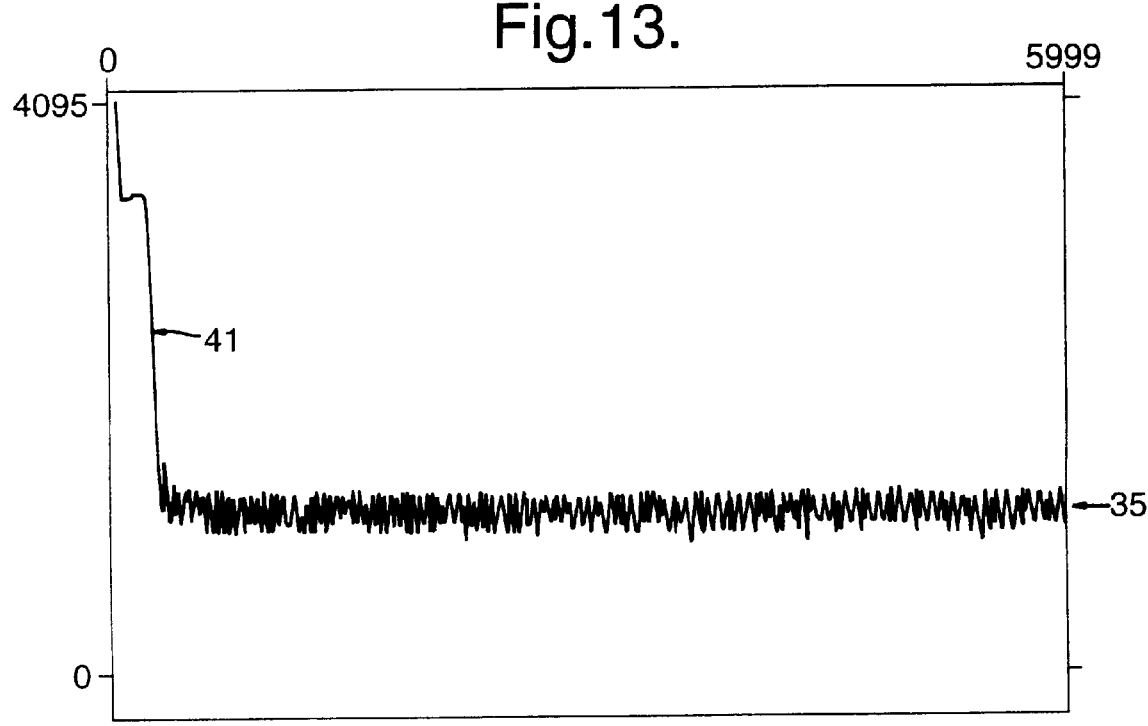
Figure 14:
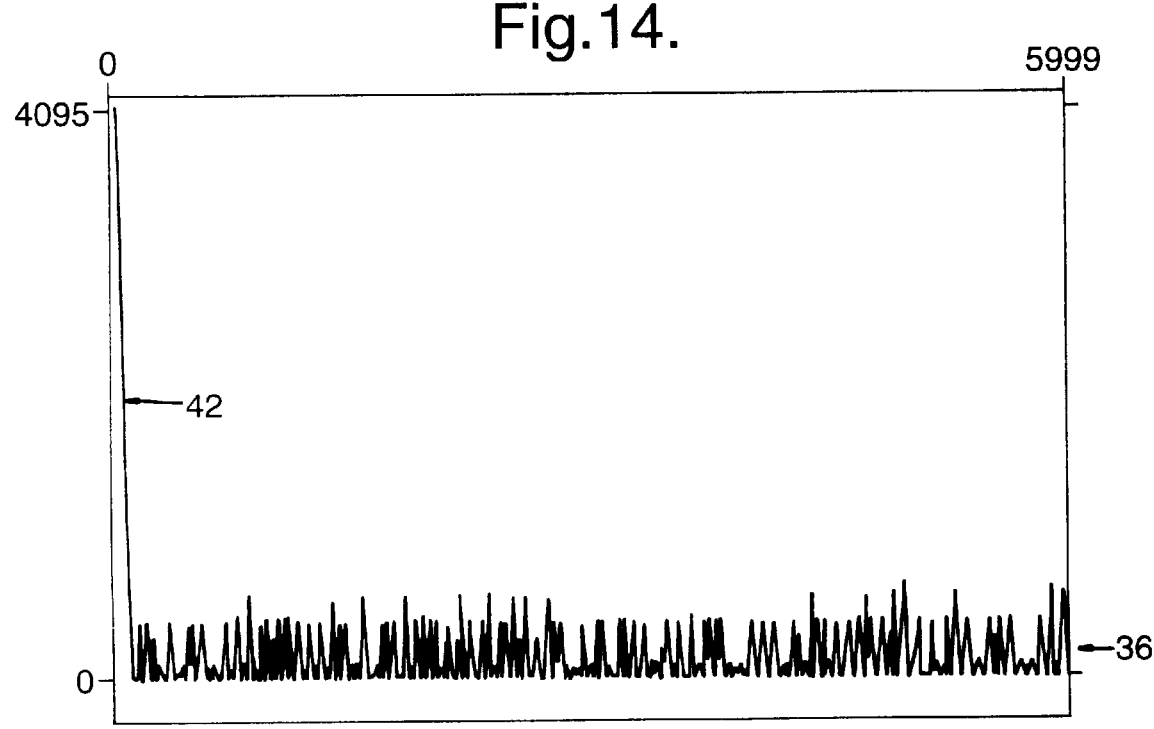

If the illuminated area on the CCD is made very small the black level can be seen to approach that of FIG. 2. This is illustrated in FIG. 6 which indicates one small unmasked region 26. FIG. 7 shows the same area of illumination as in FIG. 6 but on a different part 28 of the CCD. This shows that the unwanted black level response is independent of the position of illuminated area.

Figure 15:
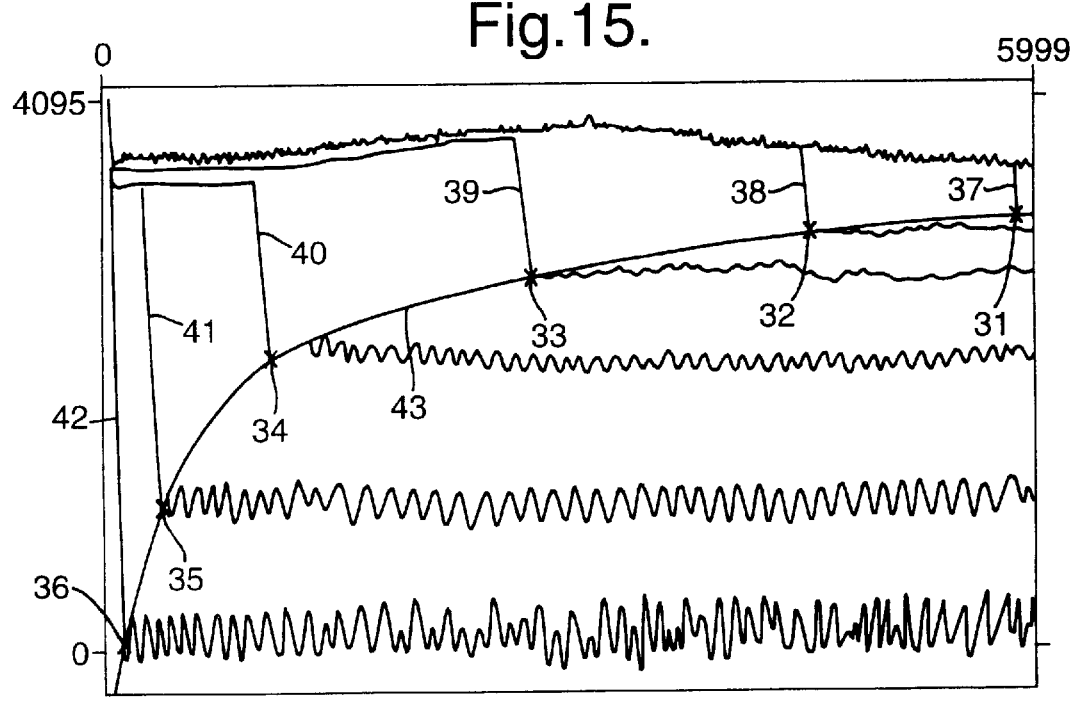

To determine how the unwanted CCD response varies according to the amount of illuminated area a series of dark response values are obtained showing the CCD output as a screen is moved in the transparency plane from one side of the CCD to the other, see FIGS. 8 to 14. The dark response values 31–36 shown in FIGS. 9 to 14 range from the high value 31 when only a small portion of the array is masked (FIG. 9) to the low value 36 (FIG. 14) when the entire array is masked. The screen edge is indicated at 37–42. For convenience the data shown in FIGS. 8–14 is plotted on a single Figure (FIG. 15) and a curve 43 is drawn to give a plot of black level against illuminated length of CCD. FIG. 15 has been calibrated using neutral density filters placed in front of the lens. The final black level in these Figures can be seen to be a little lower than in FIG. 2 and this is due to the space between the lens and CCD being made more light tight.

From FIG. 15 it can be seen that the unwanted peripheral response is related to the illuminated length of the CCD or, equivalently, to the total amount of light on the CCD. This can be expressed as follows:

$$S \text{ related to } \sum_i S_i$$

Where S is the unwanted peripheral response signal (in linear space), $S_i$ is the signal on pixel i, and the summation is carried out over all CCD pixels.

An attempt has been made to fit the curve shown in FIG. 15 with the following function, $$(S_b+S)=(a(x+c))$$

note that in FIG. 15 the vertical (y) axis is $\log_{10}(S_b+S)$.

Where $S_b$ is the black level signal when the lens is covered, a and c are constants for a given integration period, x is the distance along the CCD in mm.

Figure 16:
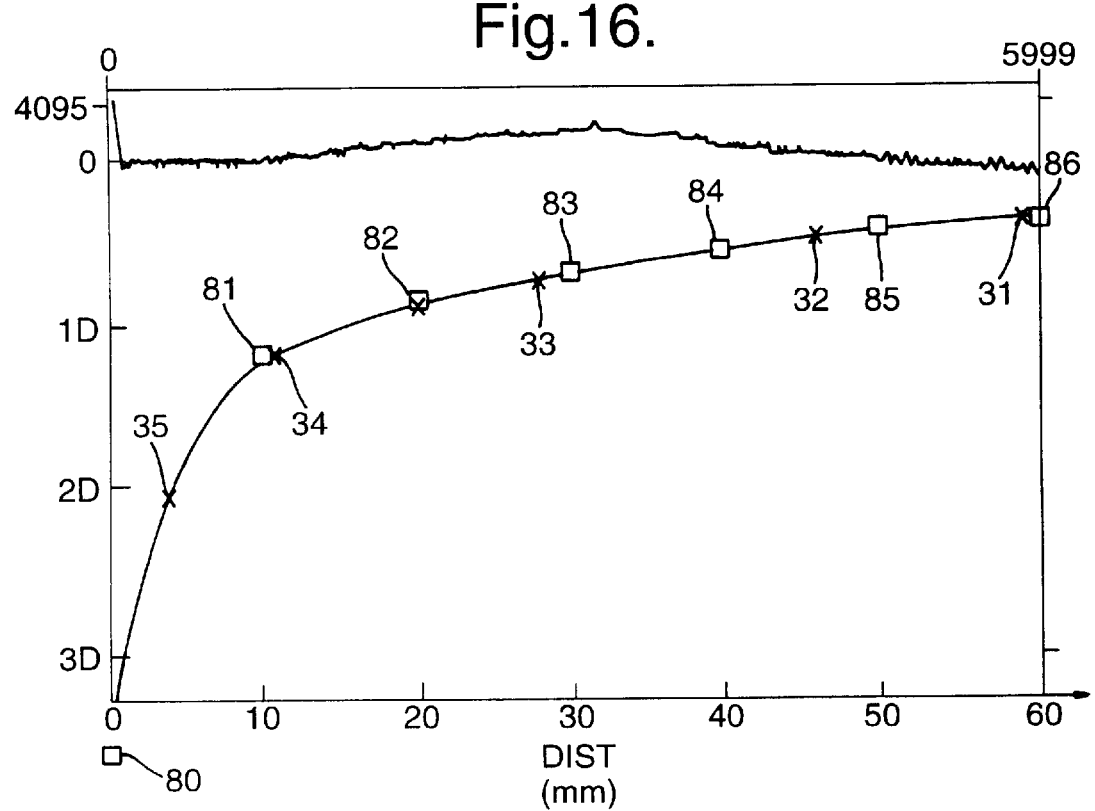

This function is plotted in FIG. 16 together with the measured response. The measured values are indicated at 31–35. The calculated values are indicated at 80–86. In this case a=0.006864 and c=0.03859. Using this analysis the effect of peripheral response on the MTF or transfer function of a CCD formed image may be determined.

It is possible to draw a number of conclusions from the above analysis as follows, 1. The dynamic range of any line of pixel values will be a function of the total amount of light incident on the array for that particular line and will vary from one scan line to another according to the corresponding spatial content of the imaged transparency.

ii. Similarly, since the unwanted peripheral CCD response is the limiting factor governing the useful dynamic range of the device, the MTF or system transfer function will be modified and degraded according to the amount of light incident on the array. This is the most serious for the case of imaging small black lines such as test charts. In this situation most of the CCD array is illuminated and according to the results obtained here, eg.see FIG. 15, it would not be possible to observe a dynamic range of any more than half a decade even if the original imaged lines had a range of 3 or 4.

iii. Since this peripheral response acts as a DC offset which is added to all the pixel values it is possible to develop an algorithm which can be implemented in hardware or software to compensate for the error. This route sums all pixel values for each scan line and using a characteristic equation, similar to that given previously, subtracts the resultant offset from each pixel value. As a result it is no longer necessary to use a slit, therefore avoiding the associated production and cost problems.

Figure 19:
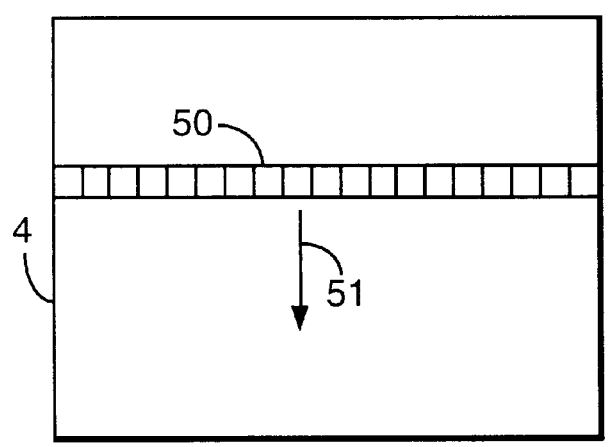
FIG. 19 is a schematic plan view of the transparency of FIG. 17.

An example of an implementation of this method of correction is illustrated in FIG. 17. The input scanning elements 1–9 have been described previously. FIG. 19 is a plan view of the transparency shown in FIG. 17. A strip of imaged pixels are schematically indicated at 50. During an input scan operation, the scanning elements 1, 2, 4 and 5 are driven with respect to the transparency 3 by a scan drive indicated schematically at 100. Thus the transparency 3 moves with respect to 1, 2, 4 and 5 which is equivalent to the imaged pixels 50 traversing the transparency as indicated at 51. During a given sampling period, light from the pixels 50 in the positions shown in FIG. 19 irradiates the CCD 5. The radiation sensors 6 on the CCD integrate the incident radiation during the sampling period to develop a charge relating to the total radiation incident on each respective sensor which, in a transfer step, is transferred into the associated transfer buffers 7,8. Typically, the transfer buffers 7,8 are constituted by one or more shift registers. The contents of the shift registers 7,8 are then shifted out to multiplexer 9. The multiplexer 9 provides a multiplexed output 10 corresponding to the previous contents of the photodiodes 6 in sequence.

The pixel value data values 10 are input to adder 11 and store 12 during a sample period under control of clock 17. Adder 11 sums the pixel data values over the sampling period and inputs the resulting sum into look-up table 13. The look-up table 13 is programmed previously (as discussed below) and outputs a DC offset value 14 representative of the peripheral response of the CCD array 5 during the present sampling period. The stored pixel data values are then readout from store 12 and the offset value 14 is subtracted from each pixel data value by subtracter 15. The resulting corrected pixel data values are then stored in data store 16.

In a previous calibration procedure, a curve of the form illustrated in FIG. 16 is calculated. The x coordinates are then converted from distance in mm to total incident radiation during the sampling period (by a linear conversion) and the resulting curve is then programmed into the look-up table in terms of a set of pairs of values, each pair comprising one value for the input sum 18 and one value for the output peripheral response value 14.

Figure 20:
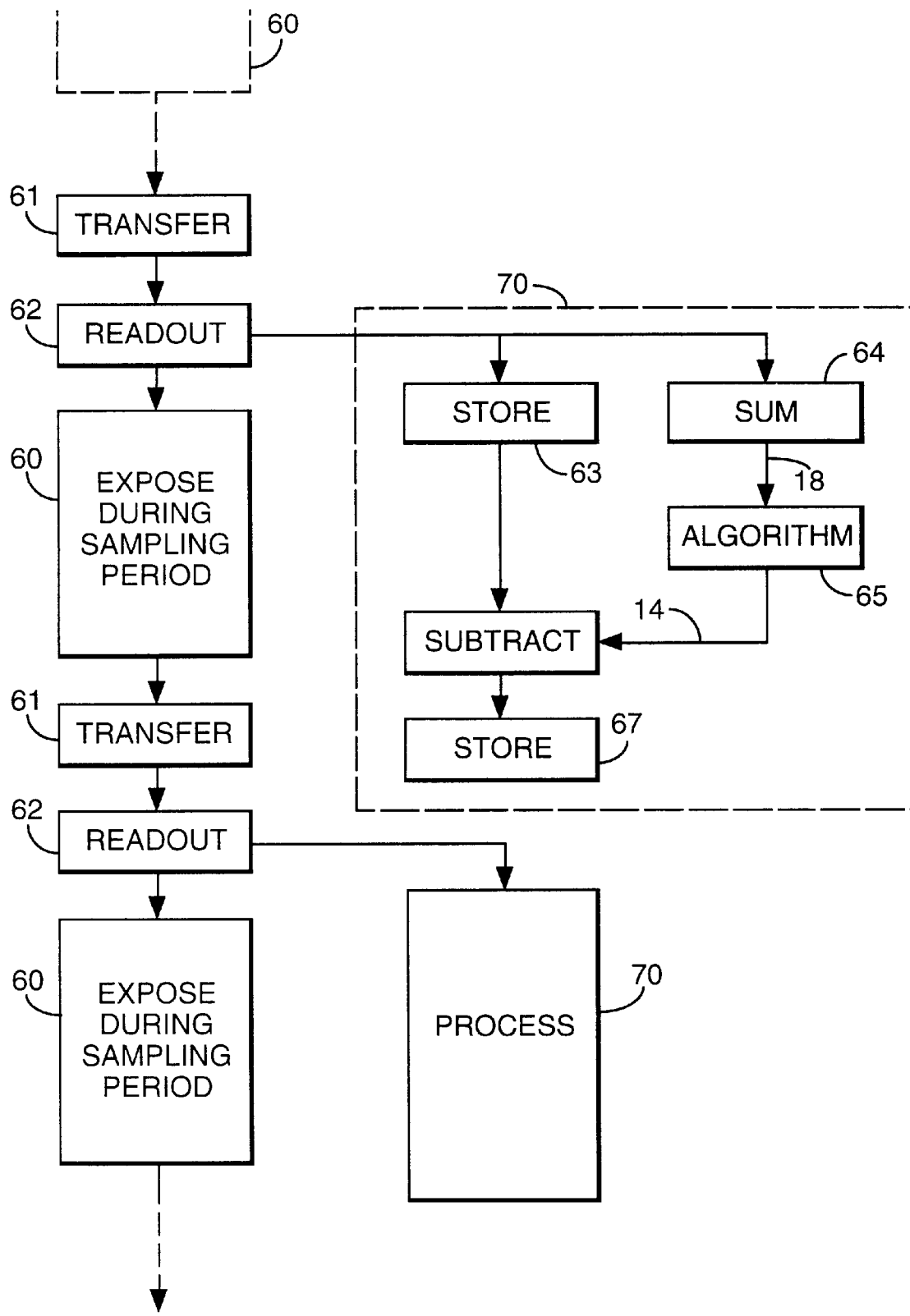
FIG. 20 is a flow diagram illustrating a software embodiment of the present invention.

A hardware implementation has been described in FIG. 17 but the hardware elements 11–16 may also be implemented in software as illustrated in FIG. 20.

Charge is integrated in the photodiodes 6 during a sampling period as indicated at 60. The charge is then transferred and readout as indicated at 61 and 62. The readout pixel data values are then processed during the next sampling period as indicated at 70. The pixel data values are first stored at 63 and summed at 64. The summed value 18 is then converted into a peripheral response value by performing a predetermined algorithm at 65. The resulting peripheral response value 14 is then subtracted from each pixel data value stored at 63 and the resulting modified pixel values are stored at 67. The process is then repeated for the next sampling period 60.

I claim:

1. A method of input scanning an image using a detector comprising an array of radiation sensors, the method comprising 1) exposing said radiation sensors to radiation from said image over a plurality of sampling periods, and for each respective sampling period:

2) obtaining a single data value from each radiation sensor;

3) summing the data values obtained during said respective sampling period;

4) determining a peripheral response value in accordance with the sum obtained in said step 3), wherein said peripheral response value for said respective sampling period is determined independently of said peripheral response values for the other sampling periods; and 5) modifying said data values in accordance with said peripheral response value obtained in said step 4).

2. A method according to claim 1 further comprising causing relative movement between said detector and said image whereby said detector receives radiation from successive portions of said image over said plurality of sampling periods.

3. A method according to claim 1 wherein said peripheral response value is obtained from a look-up table by entering said sum of the data values into the look-up table.

4. A method according to claim 1 wherein said peripheral response value is obtained in accordance with a predetermined algorithm.

5. A method according to claim 4 wherein the predetermined algorithm comprises $$S=(a(x+c))-S_b$$

where S is the peripheral response value, $S_b$ is a black level signal representative of the pixel data values when no light is incident on the detector, a and c are constants for a given length of sampling period, and x is the sum of the data values.

6. A method according to claim 1 further comprising determining the predetermined algorithm or the programming of the look-up table in a calibration procedure.

7. A method according to claim 6 wherein the calibration procedure comprises the steps of a) illuminating the detector to give a substantially uniform response across the array of sensors;

b) masking a portion of the array of sensors so that a number of the sensors are blacked out;

c) obtaining a dark signal from the blacked out sensors;

d) masking a different number of sensors and repeating step c); and e) defining the variation of the dark signal with the number of blacked out sensors.

8. A method according to claim 1 wherein the detector comprises a CCD array.

9. A method according to claim 1 wherein the data values are modified by subtracting the peripheral response value from each pixel data value.

10. Apparatus for input scanning an image, the apparatus comprising 1) a detector comprising an array of radiation sensors;

2) an imager for exposing the radiation sensors to radiation from the image over a plurality of sampling periods;

3) means for obtaining a data value from each radiation sensor for each sampling period;

4) means for summing the data values obtained for each sampling period;

5) means for determining a peripheral response value in accordance with the sum, wherein the peripheral response value for each sampling period is determined independently of the peripheral response values for the other sampling periods; and 6) means for modifying the data values in accordance with the peripheral response value.

11. A method of input scanning an image using a detector comprising an array of radiation sensors, the method comprising 1) exposing the radiation sensors to radiation from the image;

2) causing relative movement between the detector and the image whereby the detector receives radiation from successive portions of the image over a plurality of sampling periods, and for each respective sampling period:

3) obtaining a data value from each radiation sensor;

4) summing the data values obtained during the sampling period;

5) determining a peripheral response value in accordance with the sum obtained in step 4); and 6) modifying the data values in accordance with the peripheral response value obtained in step 5.

12. Apparatus for input scanning an image, the apparatus comprising 1) a detector comprising an array of radiation sensors;

2) an imager for exposing the radiation sensors to radiation from the image;

3) a drive for causing relative movement between the detector and the image whereby the detector receives radiation from successive portions of the image over a plurality of sampling periods;

4) means for obtaining a data value from each radiation sensor for each sampling period;

5) means for summing the data values obtained for each sampling period;

6) means for determining a peripheral response value in accordance with the sum; and 7) means for modifying the data values in accordance with the peripheral response value.

13. A method according to claim 12 wherein a single data value is obtained from each radiation sensor during each sampling period, and the peripheral response value for each sampling period is determined independently of the peripheral response values for the other sampling periods.

* * * * *